(12) United States Patent
Ye et al.

(10) Patent No.: US 10,048,812 B2
(45) Date of Patent: Aug. 14, 2018

(54) MONOLAYER MUTUAL-CAPACITIVE TOUCH PANEL AND CAPACITIVE TOUCHSCREEN

(71) Applicant: SHENZHEN CHINA STAR OPTOELECTRONICS TECHNOLOGY CO., LTD., Shenzhen (CN)

(72) Inventors: Chengliang Ye, Shenzhen (CN); Chun Kai Chang, Shenzhen (CN); Ruhai Fu, Shenzhen (CN); Jie Qiu, Shenzhen (CN); Yung Lun Lin, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 14/417,368

(22) PCT Filed: Oct. 13, 2014

(86) PCT No.: PCT/CN2014/088472
§ 371 (c)(1),
(2) Date: May 20, 2016

(87) PCT Pub. No.: WO2016/033852
PCT Pub. Date: Mar. 10, 2016

(65) Prior Publication Data
US 2017/0168602 A1    Jun. 15, 2017

(30) Foreign Application Priority Data
Sep. 1, 2014 (CN) .......................... 2014 1 0440649

(51) Int. Cl.
*G06F 3/033* (2013.01)
*G06F 3/044* (2006.01)
*G06F 3/041* (2006.01)

(52) U.S. Cl.
CPC ............ G06F 3/044 (2013.01); G06F 3/0416 (2013.01); *G06F 2203/04103* (2013.01)

(58) Field of Classification Search
CPC ........ G06F 3/044; G06F 3/0416; G06F 3/041; G06F 2203/04103
See application file for complete search history.

(56) References Cited

U.S. PATENT DOCUMENTS 9,146,644 B2 *  9/2015  Hershman ............... G06F 3/044
9,239,655 B2 *  1/2016  Hershman ............. G06F 3/0416
(Continued)

FOREIGN PATENT DOCUMENTS

| CN | 103105985 A | 5/2013 |
| CN | 103399679 A | 11/2013 |
| CN | 103399681 A | 11/2013 |

OTHER PUBLICATIONS

International Search Report and Written Opinion of the International Searching Authority (Forms PCT/ISA/220, PCT/ISA/237 and PCT/ISA/210) dated May 27, 2015, by the State Intellectual Property Office of China in corresponding International Application No. PCT/CN2014/088472. (12 pages).

*Primary Examiner* — Vijay Shankar
(74) *Attorney, Agent, or Firm* — Buchanan Ingersoll & Rooney PC

(57) ABSTRACT

A single layer mutual-capacitive touch panel and a capacitive touchscreen are disclosed, which belong to the field of display technologies. The scanning frequency of a SITO and the accuracy in scanning a touch signal can therefore be improved. The single layer mutual-capacitive touch panel comprises a substrate and a plurality of touch units arranged
(Continued)

in an array on the substrate, wherein each of the touch units includes a first sensing electrode for sensing a vertical coordinate of a touch signal, a second sensing electrode for sensing a horizontal coordinate of the touch signal, and a scanning electrode arranged close to the first sensing electrode and the second sensing electrode to form mutual capacitors therewith respectively.

10 Claims, 4 Drawing Sheets

(56) References Cited

U.S. PATENT DOCUMENTS

| | | | |
|---|---|---|---|
| 9,285,624 B2* | 3/2016 | Qiu | G06F 3/0412 |
| 2012/0262419 A1* | 10/2012 | Hershman | G06F 3/044 |
| | | | 345/174 |
| 2013/0154996 A1* | 6/2013 | Trend | G06F 3/044 |
| | | | 345/174 |
| 2013/0300707 A1* | 11/2013 | Hershman | G06F 3/044 |
| | | | 345/174 |
| 2014/0111467 A1 | 4/2014 | Chen et al. | |
| 2014/0313169 A1* | 10/2014 | Kravets | G06F 3/044 |
| | | | 345/178 |
| 2015/0049258 A1 | 2/2015 | Qiu et al. | |

* cited by examiner

MONOLAYER MUTUAL-CAPACITIVE TOUCH PANEL AND CAPACITIVE TOUCHSCREEN

The present application claims benefit of Chinese patent application CN 201410440649.5, entitled "Monolayer mutual-capacitive touch panel and capacitive touchscreen" and filed on Sep. 1, 2014, the entirety of which is incorporated herein by reference.

FIELD OF THE INVENTION

The present disclosure relates to the field of display technologies, and in particular, to a single layer mutual-capacitive touch panel and a capacitive touchscreen.

BACKGROUND OF THE INVENTION

Touch control one of the simplest and most convenient man-machine interaction modes available at present. Therefore, touchscreens are increasingly used in a variety of electronic products. Based on different working principles and information transmission medium, touchscreen products can be divided into four types: infrared touchscreens, capacitive touchscreens, resistance touchscreens, and surface acoustic wave touchscreens, among which, capacitive touchscreens have become the mainstream touchscreens currently due to various advantages thereof, such as long service lives, high transmittance, capability in supporting multi-touch control, etc.

Capacitive touchscreens can be surface capacitive or projected capacitive, wherein projected capacitive touchscreens can further be self-capacitive or mutual-capacitive. In a mutual-capacitive touchscreen, a sensing electrode Rx and a scanning electrode Tx are made on a surface of a substrate (usually a glass substrate) with indium tin oxide (ITO for short), wherein a coupling capacitor would be formed where two groups of electrodes cross each other. That is, the two groups of electrodes constitute two poles of the coupling capacitor, respectively. When a capacitive screen is touched with a finger, the coupling between two electrodes in the vicinity of a touch point would be affected, thereby altering the value of a coupling capacitance therebetween. The coordinate of each touch point can be calculated based on two-dimensional capacitive variation data of a mutual-capacitive touchscreen. Therefore, even if there is a plurality of touch points on the screen, the real coordinate of each of the touch points can be calculated.

Currently, there substantially exist two varieties of mutual-capacitive touchscreens. One is termed a double layer ITO (DITO for short) mutual-capacitive touchscreen, in which the sensing electrode Rx and the scanning electrode Tx are manufactured with two layers of ITO conductive materials and arranged on two parallel but non-coplanar planes, respectively. This type of touchscreens has to be manufactured through a complex manufacturing procedure and yield rates thereof are restricted thereby. The other is termed a single layer ITO (SITO for short) mutual-capacitive touchscreen, in which the sensing electrode Rx and the scanning electrode Tx are arranged on one and the same plane. The manufacturing procedure of a SITO mutual-capacitive touchscreen is simpler than that of a DITO mutual-capacitive touchscreen, and therefore SITO mutual-capacitive touchscreens have become the mainstream products currently.

It has been found that according to an existing drive mode, scanning electrodes Tx are scanned sequentially by line at a relatively low scanning frequency, thereby preventing the SITO mutual-capacitive touchscreen from being scanned at a high frequency. As a result, touch signals are scanned with low accuracy.

SUMMARY OF THE INVENTION

The present disclosure aims to provide a single layer mutual-capacitive touch panel and a capacitive touchscreen, which can improve the scanning frequency of a SITO mutual-capacitive touchscreen and the accuracy in scanning a touch signal.

According to a first aspect of the present disclosure, a single layer mutual-capacitive touch panel is provided, comprising a substrate and a plurality of touch units arranged in an array on the substrate, wherein each of the touch units includes a first sensing electrode for sensing a vertical coordinate of a touch signal, a second sensing electrode for sensing a horizontal coordinate of the touch signal, and a scanning electrode arranged close to the first sensing electrode and the second sensing electrode to form mutual capacitors therewith respectively. The scanning electrodes of all the plurality of touch units are connected to one another. The first sensing electrodes of the touch units that are located in one and the same line are connected to one another, and the second sensing electrodes of the touch units that are located at one and the same column are connected to one another.

The first sensing electrode and the second sensing electrode are both in the form of strips, and are parallel with each other.

The scanning electrode of a touch unit comprises a first sub-scanning electrode, which is in the form of a strip, and arranged between the first sensing electrode and the second sensing electrode of said touch unit, in parallel with said first sensing electrode and said second sensing electrode.

The first sub-scanning electrodes of the touch units located at one and the same column are formed into one piece, and the first sub-scanning electrodes of the touch units located at all columns are connected to one another.

The scanning electrode of a touch unit further comprises a second sub-scanning electrode, which is connected to the first sub-scanning electrode of said touch unit, and is in the form of a frame having an opening. The first sensing electrode of a touch unit is located inside the frame of the second sub-scanning electrode of said touch unit.

The first sub-scanning electrode of a touch unit shares a side with the second sub-scanning electrode of said touch unit.

The distance from the first sub-scanning electrode of a touch unit to the first sensing electrode of said touch unit is in the range from 10 to 20 µm, and the distance from the first sub-scanning electrode of a touch unit to the second sensing electrode of said touch unit is in the range from 10 to 20 µm also.

The distance from the first sub-scanning electrode of a touch unit to the second sensing electrode of said touch unit is in the range from 10 to 20 µm, and the distance from the second sub-scanning electrode of a touch unit to the first sensing electrode of said touch unit is in the range from 10 to 20 µm also.

A scanning frequency of the single layer mutual-capacitive touch panel is in the range from 200 to 300 MHz.

In the technical solution according to the embodiments of the present disclosure, the single layer mutual-capacitive touch panel is provided, comprising a plurality of touch units. Each of the touch units includes a scanning electrode, a first sensing electrode, and a second sensing electrode. According to the present disclosure, the first sensing electrodes of the touch units located in one and the same line are connected to one another, and the second sensing electrodes of the touch units located at one and the same column are connected to one another. The first sensing electrode can be used for sensing a vertical coordinate of a touch signal, and the second sensing electrode can be used for sensing a horizontal coordinate of a touch signal. Moreover, the scanning electrodes of all the touch units located on the single layer mutual-capacitive touch panel are connected to one another, such that the scanning electrodes on the whole single layer mutual-capacitive touch panel can perform scanning simultaneously. As a result, a high scanning frequency can be achieved for the single layer mutual-capacitive touch panel of the present disclosure, and the accuracy in scanning a touch signal can be improved.

According to a second aspect of the present disclosure, a capacitive touchscreen is provided, comprising the single layer mutual-capacitive touch panel as described above according to the first aspect of the present disclosure.

Other features and advantages of the present disclosure will be further explained in the following description, and partly become self-evident therefrom, or be understood through implementing the present disclosure. The objectives and advantages of the present disclosure will be achieved through the structure specifically pointed out in the description, claims, and the accompanying drawings.

BRIEF DESCRIPTION OF THE DRAWINGS

In order to explicitly illustrate the technical solution in the embodiments of the present disclosure, accompanying drawings that will be referred to in illustrating the embodiments will be simply explained, in which.

DETAILED DESCRIPTION OF THE EMBODIMENTS

The present disclosure will be explained in details with reference to the embodiments and the accompanying drawings, whereby it can be fully understood how to solve the technical problem by the technical means according to the present disclosure and achieve the technical effects thereof, and thus the technical solution according to the present disclosure can be implemented. It is important to note that as long as there is no structural conflict, all the technical features mentioned in all the embodiments may be combined together in any manner, and the technical solutions obtained in this manner all fall within the scope of the present disclosure.

Figure 1:
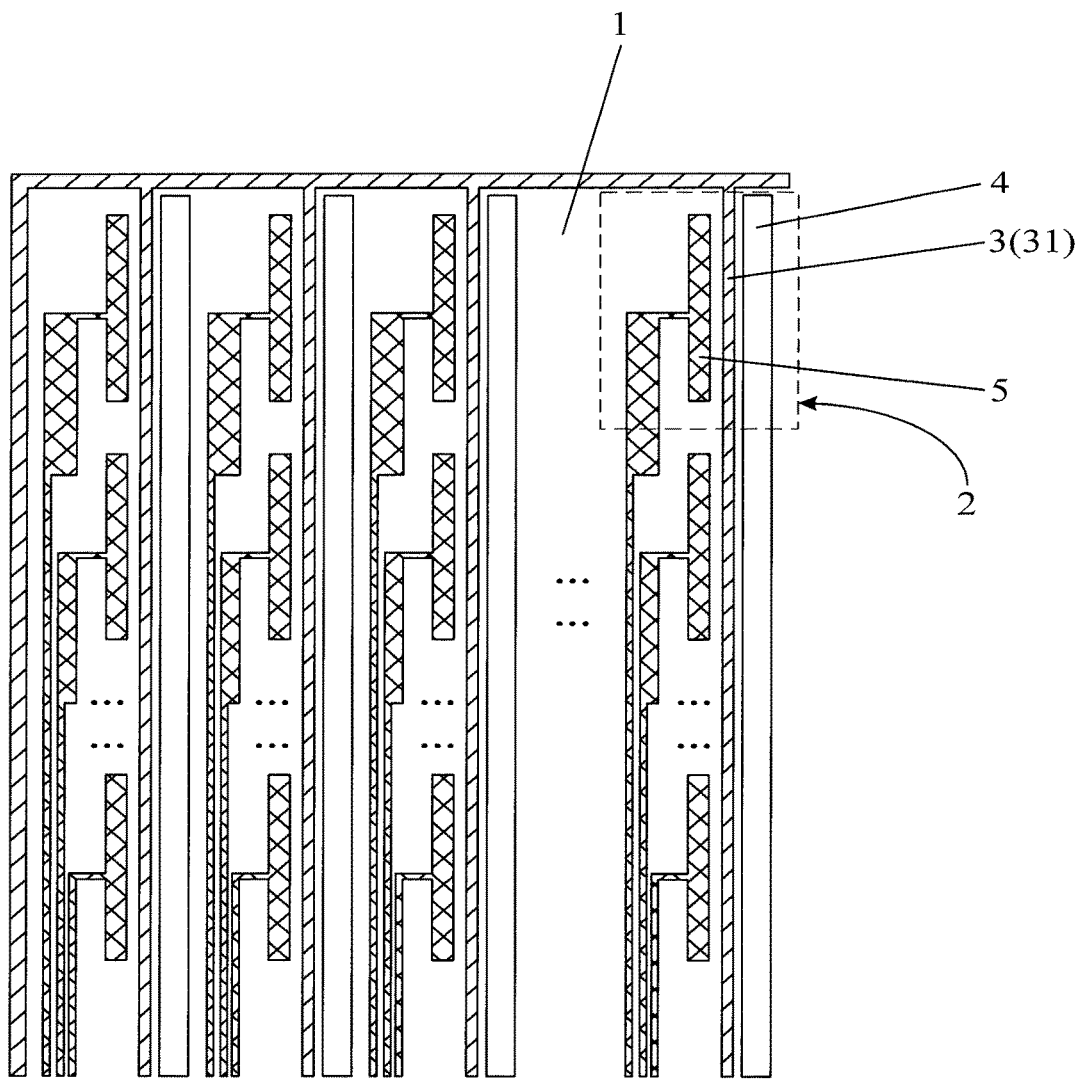
FIG. 1 shows a structural diagram of a single layer mutual-capacitive touch panel according to the embodiments of the present disclosure.

In the embodiments of the present disclosure, a single layer mutual-capacitive touch panel is provided. As shown in FIG. 1, the single layer mutual-capacitive touch panel comprises a substrate 1 and a plurality of touch units 2 arranged in an array on the substrate 1. Specifically, each of the touch units 2 includes a scanning electrode 3, a first sensing electrode 4, and a second sensing electrode 5. The scanning electrode 3 is arranged close to the first sensing electrode 4 and the second sensing electrode 5 to form mutual capacitors therewith respectively. The first sensing electrode 4 senses a vertical coordinate of a touch signal, and the second sensing electrode 5 senses a horizontal coordinate of a touch signal. That is, the first sensing electrode 4 and the second sensing electrode 5 can cooperate to sense a specific coordinate of a control signal, so that the single layer mutual-capacitive touch panel can provide specific feedback in a convenient manner.

In the embodiment as shown in FIG. 1, the scanning electrodes 3 of all the touch units 2 are connected to one another; the first sensing electrodes 4 of the touch units 2 that are located in one and the same line are connected to one another; and the second sensing electrodes 5 of the touch units 2 that are located at one and the same column are connected to one another.

According to the technical solution provided in the embodiments of the present disclosure, a single layer mutual-capacitive touch panel is provided, including a plurality of touch units. Each of the touch units has a scanning electrode, a first sensing electrode, and a second sensing electrode. In the present disclosure, the first sensing electrodes located at one and the same line are connected to one another, and the second sensing electrodes of the touch units that are located at one and the same column are connected to one another. The first sensing electrode and the second sensing electrode are respectively used for sensing a vertical coordinate and a horizontal coordinate of a touch signal. Moreover, the scanning electrodes of all the touch units located on the single layer mutual-capacitive touch panel are connected to one another. As a result, all the scanning electrodes on the whole single layer mutual-capacitive touch panel can perform scanning simultaneously, thus enabling high-frequency scanning of the single layer mutual-capacitive touch panel of the present disclosure, and improving accuracy in scanning the touch signal.

Figure 2:
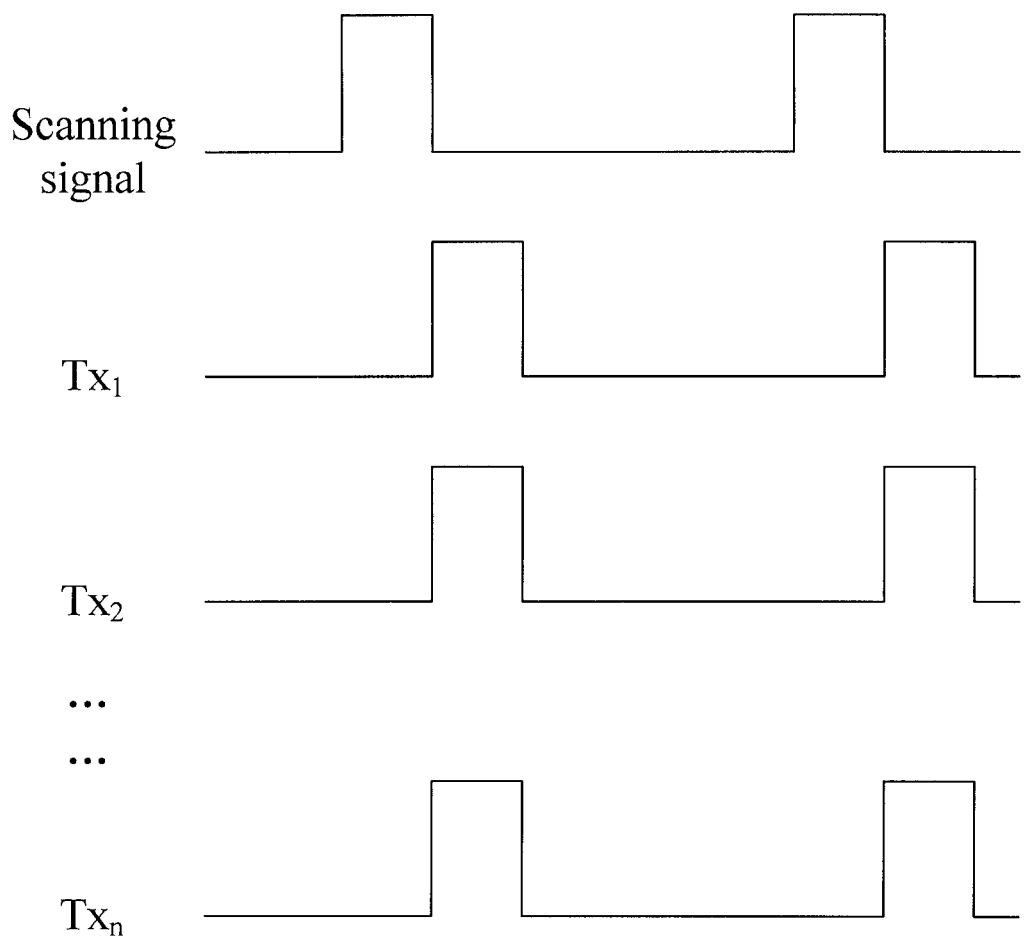
FIG. 2 shows a drive timing diagram of the single layer mutual-capacitive touch panel according to the embodiments of the present disclosure.

In the embodiments of the present disclosure, with the scanning electrodes 3 of all the touch units 2 being connected to one another, the scanning electrodes 3 of all the touch units 2 can perform scanning simultaneously when the single layer mutual-capacitive touch panel sends a scanning signal. That is, all scanning electrodes 3 as indicated in FIG. 2 (i.e., $Tx_1, Tx_2, \ldots, Tx_n$ in FIG. 2) receive a scanning signal of a high-level voltage sent from the single layer mutual-capacitive touch panel at the same time, and then perform scanning. Therefore, the scanning frequency of the scanning electrodes can be raised to a level in the range from 200 to 300 MHz, or even higher, such as 500 MHz.

Preferably, in order to ensure a compact structure of the touch unit 2, as depicted in FIG. 1, the first sensing electrode 4 and the second sensing electrode 5 can be arranged both in the form of strips, and in parallel with each other.

Specifically, as FIG. 1 shows, the scanning electrode 3 can comprise a first sub-scanning electrode 31, which can also be in the form of a strip and located between the first sensing electrode 4 and the second sensing electrode 5 in parallel therewith.

In this case, as shown in FIG. 1, the first sub-scanning electrode 31 of a touch unit is located between the first sensing electrode 4 and the second sensing electrode 5 of said touch unit, and is arranged close to the first sensing electrode 4 and the second sensing electrode 5 of said touch unit, to form mutual capacitors therewith respectively. In order to ensure formation of mutual capacitors between the first sub-scanning electrode 31 and the first sensing electrode 4, and between the first sub-scanning electrode 31 and the second sensing electrode 5, it is preferred that, the distance from the first sub-scanning electrode 31 of a touch unit to the first sensing electrode 4 of said touch unit, and the distance from the first sub-scanning electrode 31 of a touch unit to the second sensing electrode 5 of said touch unit are both in the range from 10 to 20 µm.

As previously mentioned in this description, according to the embodiments of the present disclosure, the scanning electrodes 3 of all the touch units 2 are connected to one another. Therefore, in order to simplify the wires on the substrate and reduce difficulties in the manufacturing procedure, as FIG. 1 shows, the first sub-scanning electrodes 31 of the touch units 2 located at one and the same column can be formed into one piece. Moreover, the first sub-scanning electrodes 31 of the touch units located at all columns are connected to one another. That is, the first sub-scanning electrodes 31 of the touch units located at all columns are connected to one another at an edge of the substrate 1.

Figure 3:
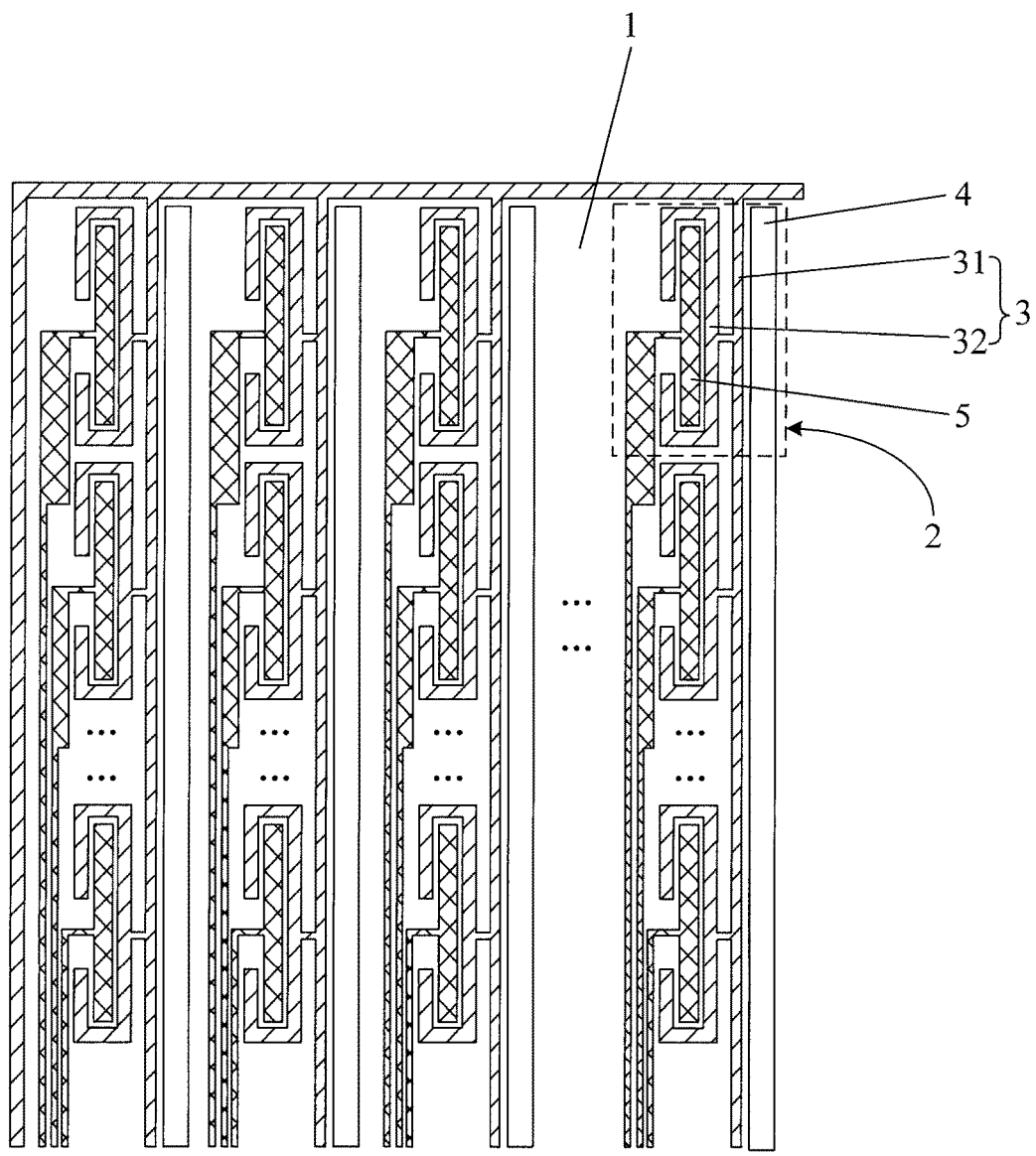
FIG. 3 shows a further structural diagram of the single layer mutual-capacitive touch panel according to the embodiments of the present disclosure.

In the embodiment as shown in FIG. 1, a relatively small area of the first sub-scanning electrode 31 of a touch unit relative to the first sensing electrode 4 of said touch unit renders the capacitance value of a mutual capacitor formed therebetween relatively small. In order to increase the capacitance value of the mutual capacitor formed between the scanning electrode 3 of a touch unit and the first sensing electrode 4 of said touch unit, enable better sensing effects therebetween, and therefore indirectly increase the accuracy in sensing a touch signal by the single layer mutual-capacitive touch panel, as indicated in FIG. 3, the scanning electrode 3 of a touch unit further comprises a second sub-scanning electrode 32, which is connected to the first sub-scanning electrode 31 of said touch unit. The second sub-scanning electrode 32 is in the form of a frame having an opening. And the first sensing electrode 4 of a touch unit is located inside the frame of the second sub-scanning electrode 32 of said touch unit.

Specifically, in the embodiment as shown in FIG. 3, both long sides of the frame-shaped second sub-scanning electrode 32 of a touch unit are in parallel with the first sensing electrode 4 of said touch unit. The opening is arranged at a middle portion of either of the long sides of the frame, while the other long side thereof is located between the first sensing electrode 4 and the first sub-scanning electrode 31 of said touch unit. The wires of the first sensing electrode 4 of the touch units 2 located in one and the same line can extend from the openings of corresponding second sub-scanning electrodes 32. The wires of the second sub-scanning electrodes 32 of the touch units located in one and the same line are connected to one another at an edge of the substrate 1 where no touch unit 2 is provided, and feed back potential variations of the second sub-scanning electrodes 32 to an analysis and processing unit of the single layer mutual-capacitive touch panel, which can therefore judge availability of a touch signal in a convenient manner.

It should be noted that, in the embodiment as indicated in FIG. 1 or FIG. 3, the wire of each first sensing electrode 4 can be properly increased in width at sparsely wired positions on the substrate. This can reduce resistance of the wire, and thereby guarantee the working effects of each first sensing electrode 4. As a result, the accuracy in sensing a touch signal by the single layer mutual-capacitive touch panel can be secured. In addition, the wiring density on the substrate 1 can be increased, which can assure a user's viewing effects.

In addition, according to the embodiments of the present disclosure, as indicated in FIG. 3, a long side of the second sub-scanning electrode 32 of a touch unit can be connected to the first sub-scanning electrode 31 of said touch unit, so that the first sub-scanning electrode 31 and the second sub-scanning electrode 32 can be formed into one piece.

In order to ensure a sufficient area of the second sub-scanning electrode 32 of a touch unit relative to the first sensing electrode 4 of said touch unit, and simplify the wires of the touch units as shown in FIG. 2, the first sub-scanning electrode 31 of a touch unit 2 can preferably share a side with the second sub-scanning electrode 32 of said touch unit 2. For example, as shown in FIG. 4, the long side of the second sub-scanning electrode 32 of FIG. 3 close to the first sub-scanning electrode 31 can form a side of the first sub-scanning electrode 31.

Figure 4:
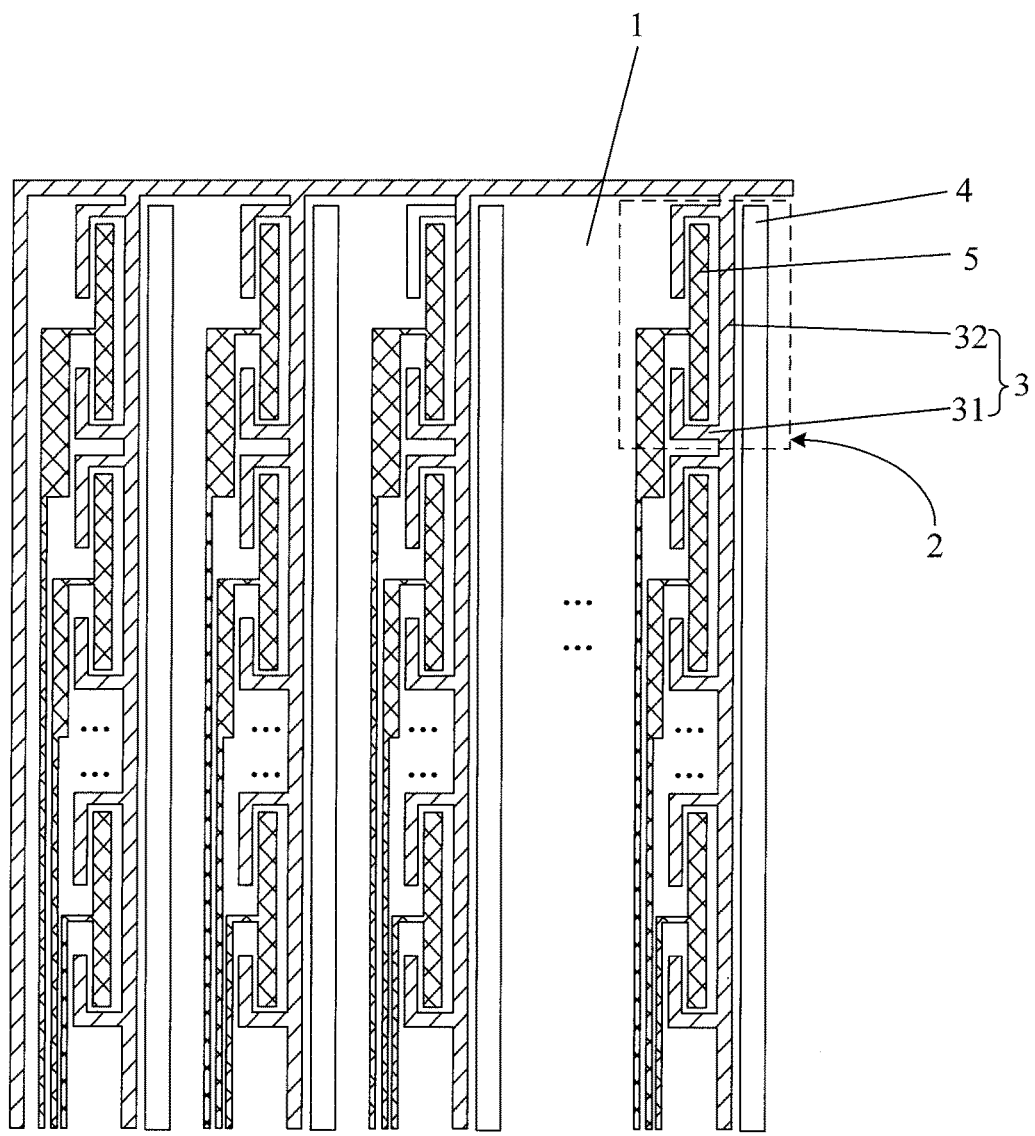
FIG. 4 shows a still further structural diagram of the single layer mutual-capacitive touch panel according to the embodiments of the present disclosure.

Similarly, in order to ensure formation of a mutual capacitor between the first sub-scanning electrode 31 of a touch unit and the second sensing electrode 5 of said touch unit, as shown in FIG. 3 or FIG. 4, the distance from the first sub-scanning electrode 31 of a touch unit 2 to the second sensing electrode 5 of said touch unit 2 is in the range from 10 to 20 µm. Correspondingly, the distance from the second sub-scanning electrode 32 of a touch unit 2 to the first sensing electrode 4 of said touch unit 2 should also be in the range from 10 to 20 µm.

Furthermore, in the embodiments of the present disclosure, a capacitive touchscreen is provided. The capacitive touchscreen comprises the single layer mutual-capacitive touch panel as described above, and can be used in display devices such as liquid crystal televisions, liquid crystal displays, mobile phones, tablet personal computers, etc.

The above embodiments are described only for better understanding, rather than restricting, the present disclosure. Any person skilled in the art can make amendments to the implementing forms or details without departing from the spirit and scope of the present disclosure. The scope of the present disclosure should still be subject to the scope defined in the claims.

LIST OF REFERENCE NUMBERS 1. substrate;
2. touch unit;
3. scanning electrode;
31. first sub-scanning electrode;
32. second sub-scanning electrode;
4. first sensing electrode; and
5. second sensing electrode.

The invention claimed is:

1. A single layer mutual-capacitive touch panel, comprising a substrate and a plurality of touch units arranged in an array on the substrate, wherein each of the touch units includes a first sensing electrode for sensing a vertical coordinate of a touch signal, a second sensing electrode for sensing a horizontal coordinate of the touch signal, and a scanning electrode arranged close to the first sensing electrode and the second sensing electrode to form mutual capacitors therewith respectively, wherein the scanning electrodes of all the plurality of touch units are connected to one another, and the first sensing electrodes of the touch units that are located in one and the same line are connected to one another, and the second sensing electrodes of the touch units that are located at one and the same column are connected to one another, wherein all the first sensing electrodes, the second sensing electrodes and the scanning electrodes are arranged on one and the same plane of the substrate.

2. The single layer mutual-capacitive touch panel according to claim 1, wherein the first sensing electrode and the second sensing electrode are both in the form of strips, and are parallel with each other.

3. The single layer mutual-capacitive touch panel according to claim 2, wherein the scanning electrode of a touch unit comprises a first sub-scanning electrode, which is in the form of a strip, and arranged between the first sensing electrode and the second sensing electrode of said touch unit, in parallel with said first sensing electrode and said second sensing electrode.

4. The single layer mutual-capacitive touch panel according to claim 3, wherein the first sub-scanning electrodes of the touch units located at one and the same column are formed into one piece, and the first sub-scanning electrodes of the touch units located at all columns are connected to one another.

5. The single layer mutual-capacitive touch panel according to claim 3, wherein the scanning electrode of a touch unit further comprises a second sub-scanning electrode, which is connected to the first sub-scanning electrode of said touch unit, and is in the form of a frame having an opening, and wherein the first sensing electrode of a touch unit is located inside the frame of the second sub-scanning electrode of said touch unit.

6. The single layer mutual-capacitive touch panel according to claim 5, wherein the first sub-scanning electrode of a touch unit shares a side with the second sub-scanning electrode of said touch unit.

7. The single layer mutual-capacitive touch panel according to claim 3, wherein the distance from the first sub-scanning electrode of a touch unit to the first sensing electrode of said touch unit is in the range from 10 to 20 µm, and the distance from the first sub-scanning electrode of a touch unit, to the second sensing electrode of said touch unit is in the range from 10 to 20 µm also.

8. The single layer mutual-capacitive touch panel according to claim 5, wherein the distance from the first sub-scanning electrode of a touch unit to the second sensing electrode of said touch unit is in the range from 10 to 20 µm, and the distance from the second sub-scanning electrode of a touch unit to the first sensing electrode of said touch unit is in the range from 10 to 20 µm also.

9. The single layer mutual-capacitive touch panel according to claim 1, wherein a scanning frequency of the single layer mutual-capacitive touch panel is in the range from 200 to 300 MHz.

10. A capacitive touchscreen, comprising a single layer mutual-capacitive touch panel, which includes a substrate and a plurality of touch units arranged in an array on the substrate, wherein each of the touch units has a first sensing electrode for sensing a vertical coordinate of a touch signal, a second sensing electrode for sensing a horizontal coordinate of the touch signal, and a scanning electrode arranged close to the first sensing electrode and the second sensing electrode to form mutual capacitors therewith respectively,
wherein the scanning electrodes of all the plurality of touch units are connected to one another, and
the first sensing electrodes of the touch units that are located in one and the same line are connected to one another, and the second sensing electrodes of the touch units that are located at one and the same column are connected to one another,
wherein all the first sensing electrodes, the second sensing electrodes and the scanning electrodes are arranged on one and the same plane of the substrate.

* * * * *